3,369,967
COMPOSITIONS FOR TREATING OBESITY AND METHODS OF USE

Nguyen Dat Xuong, Antony, and Roland-Yves Mauvernay, Riom, France, assignors to Société Anonyme dite Laboratoire d'Analyses et de Recherches Biologiques Mauvernay-Centre Européen de Recherches Mauvernay-(C.E.R.M.), Riom, France
No Drawing. Filed Nov. 20, 1963, Ser. No. 325,150
Claims priority, application Great Britain, Nov. 21, 1962, 44,030/62
5 Claims. (Cl. 167—55)

The invention relates to a new group of sympathomimetic compounds of the amphetamine series which has considerable advantages in comparison with the latter.

The invention is directed to the p-chlorophenoxyacetate of amphetamine.

The compound of the invention has particular applicability as an anorectic compound in the treatment of obesity in humans.

This compound has the formula:

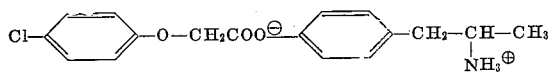

It occurs in the form of fine colorless crystals having a melting point of 110° C., which are moderately soluble in warm water and which are soluble in ethanol and in glycols.

It is prepared by a simple reaction between amphetamine and p-chloro-phenoxyacetic acid, in a common solvent, this reaction being aided by gentle heat, in accordance with the following method:

37.3 grams (⅕ mole) of para-chloro-phenoxyacetic acid (melting point 150° C.) are dissolved in a solution of 50 cc. of 95% ethanol and 100 cc. of distilled water. The pH of this solution is in the region of 3.

The solution is stirred as ⅕ mole of racemic amphetamine base is gradually added to it. The pH of this new solution is between 7 and 7.2. It is evaporated to dryness over a water-bath, under vacuum, in a Büchi evaporator or in any other suitable evaporator. It is dried without heating, and recrystallized from ethanol. This produces fine colorless crystals melting at 110 to 111° C. in a capillary tube.

The high medicinal value of amphetamine is widely recognized, but its use is relatively limited by a certain number of disadvantages, namely considerable toxicity and secondary effects with the doses required to be effective. Amphetamine p-chloro-phenoxyacetate has a toxicity of five to seven times less than that of amphetamine and a far greater anorectic activity, while the secondary effects are the same. It follows that this compound permits effective and safe treatment of cases of obesity in which the permissible dose of amphetamine would be virtually ineffective.

By pharmaco-dynamic experiments, the following toxicities have been determined, expressed comparatively to those of amphetamine:

| Toxicity (mg./kg.) | DL-amphetamine | Amphetamine p-chloro-phenoxyacetate |
|---|---|---|
| LD 50 oral: mice | 25 | 316.7 |
| LD 100 Intravenous: rats | 76.5 | 126.4 |

Since amphetamine p-chloro-phenoxyacetate has a 39% content of DL-amphetamine, it is at least five times less toxic than amphetamine itself. Assuming that its other properties were identical, it would be possible to administer doses five times greater with no attendant disadvantages for the patient.

A corresponding experiment has been carried out to determine the weight changes of rats to which DL-amphetamine, physiological serum and amphetamine p-chloro-phenoxyacetate were administered orally, the doses of amphetamine being between 4 and 8 mg./kg. and those of amphetamine p-chloro-phenoxyacetate being between 10 and 25 mg./kg., in order to maintain the same molecular proportion of amphetamine. This experiment had the following comparative results, independently of the administered doses:

| Treatment | Change in weight |
|---|---|
| Serum (control) | None. |
| DL-amphetamine | Do. |
| Amphetamine p-chloro-phenoxyacetate. | Average loss of weight of 10 to 15%. |

Whatever the dose, amphetamine seems to have no effect on weight, whereas, with corresponding doses, the loss of weight of the animals reaches a high point towards the 15th day of treatment, this loss of weight being greater in males than in females.

The secondary effects of amphetamine p-chloro-phenoxyacetate compared with those of amphetamine are as follows:

(a) slightly less stimulation of the central nervous system than with amphetamine, this being so both in a normal animal and in an animal in the state of barbituric hypnosis;

(b) a similar hypertensive action.

These properties were also shown in clinical experiments in which amphetamine p-chloro-phenoxyacetate was administered in the form of pills of 10 mg. two to four times a day. In the many tens of patients treated for obesity a loss of weight of the order of 1.5 kg. per week was noticed, accompanied by a loss of hunger and a moderated psycho-tonic action.

Thus this medicine proves to be particularly useful. This usefulness is surprising, considering the virtually ineffective action of amphetamine in permissible doses.

Amphetamine p-chloro-phenoxyacetate has been described in detail as an illustration of the invention. However, the invention is not limited to this one compound, but on the contrary covers the p-chloro-phenoxy-acetates of compounds related to amphetamine in general, namely, methylamphetamine, ephedrine, ergotamine, phenylephrine and the like, the formation of this organic salt of the aforementioned excitants and of analogous compounds presenting in each case the advantage of a reduced toxicity. Thus the p-chloro-phenoxyacetate of DL-methylamphetamine, which occurs in the form of fine colorless crystals melting at 81° C., soluble in alcohols and glycols, and in ethyl acetate, and the p-chloro-phenoxyacetate of d-ephedrine, which also occurs in the form of fine colorless crystals, melting at 155° C., soluble in alcohols and glycols, possess important anorectic properties which are comparable with those of amphetamine p-chloro-phenoxyacetate which have been described in detail above.

We claim:

1. A therapeutic composition for use in treating obesity consisting essentially of a dose effective for treating obesity of the p-chloro-phenoxyacetate of amphetamine in an inert carrier.

2. A composition as claimed in claim 1, wherein said dose is 10 mg.

3. A method for the treatment of obesity comprising administering to a patient requiring treatment for obesity, a dose effective for treating obesity of the p-chloro-phenoxyacetate amphetamine.

4. A method as claimed in claim 3, wherein said dose is 10 mg.

5. In a method for the treatment of human obesity, the step of administering to a human a composition comprising 10 mg. of amphetamine p-chloro-phenoxyacetate from 2 to 4 times a day.

References Cited

UNITED STATES PATENTS

| | | | |
|---|---|---|---|
| 3,038,931 | 6/1962 | Harms | 260—501 |
| 3,071,613 | 1/1963 | Surrey | 260—501 |
| 2,156,242 | 4/1939 | Kharasch et al. | 260—285.5 |
| 2,507,830 | 5/1950 | Stoll et al. | 260—285.5 |
| 2,748,052 | 5/1956 | Rosner | 167—55 |
| 2,881,113 | 4/1959 | Millman | 167—55 |

OTHER REFERENCES

Burger, Medicinal Chemistry, 2d Edition, pp. 613–615 (1960).

Julia, Chem. Abst., vol. 52, 1958, pages 1092 and 1093B.

SAM ROSEN, *Primary Examiner.*

J. D. RANDOLPH, *Examiner.*

D. M. KERR, *Assistant Examiner.*